United States Patent [19]

Sasaki et al.

[11] Patent Number: 5,189,124
[45] Date of Patent: Feb. 23, 1993

[54] PROCESS FOR PRODUCING α-OLEFIN POLYMERS

[75] Inventors: Toshio Sasaki; Takeshi Ebara; Hirofumi Jyohoji; Kooji Mizunuma, all of Ichihara; Kiyoshi Kawai, Chiba, all of Japan

[73] Assignee: Sumitomo Chemical Company, Limited, Osaka, Japan

[21] Appl. No.: 801,584

[22] Filed: Dec. 5, 1991

Related U.S. Application Data

[63] Continuation of Ser. No. 433,219, Nov. 8, 1989, abandoned.

[30] Foreign Application Priority Data

Nov. 11, 1988 [JP] Japan .................. 63-286367

[51] Int. Cl.$^5$ .................. C08F 4/651; C08F 10/00
[52] U.S. Cl. .................. 526/119; 502/125; 526/125; 526/351
[58] Field of Search .................. 526/119, 125

[56] References Cited

U.S. PATENT DOCUMENTS 4,672,050  6/1987  Sasaki et al. .

FOREIGN PATENT DOCUMENTS 0045876  8/1981  European Pat. Off. .
0045975  2/1982  European Pat. Off. .
2111066  6/1983  United Kingdom .
2167763  1/1984  United Kingdom .
2167762  6/1986  United Kingdom .

OTHER PUBLICATIONS

Journal of Polymer Science: Part A, Polymer Chemistry, 25, 3241–3253 (1987).

Primary Examiner—Edward J. Smith
Attorney, Agent, or Firm—Stevens, Davis, Miller & Mosher

[57] ABSTRACT

A process for producing an α-olefin polymer which comprises homopolymerizing or copolymerizing an α-olefin by the use of a catalyst system comprising:

(A) a solid catalyst component (A) containing at least magnesium, titanium, halogen and ester compound as indispensable components, and (B) a catalyst component (B) produced by reacting an organoaluminum compound represented by general formula $R^1_m AlY_{3-m}$ ($R^1$ represents an aliphatic hydrocarbon group having 1 to 8 carbon atoms, Y represents halogen, hydrogen or alkoxy group having 1 to 20 carbon atoms, and m represents a number satisfying $2 \leq m \leq 3$) with an organic silicon compound represented by general formula $R^2_n Si(OR^3)_{4-n}$ ($R^2$ represents alicyclic hydrocarbon group or aromatic hydrocarbon group having 5 to 20 carbon atoms, $R^3$ represents a hydrocarbon group having 1 to 20 carbon atoms, and n represents a number satisfying $0 \leq n \leq 3$) in the state of a solution so that the product of this reaction becomes satisfying the following formula: $0.2 \leq K \leq 2.2$, $$K = \frac{m}{Z} \cdot \frac{S'}{S + S'}$$

[S represents the area of a peak in $^{13}$C-NMR spectrum of the reaction product assignable to Al-$R^1$ bond, S' represents the area of a peak in $^{13}$C-NMR of the product assignable to the Si-$R^1$ bond formed by the reaction with organoaluminum compound, and Z represents molar ratio of Si atom to Al atom in component (B)].

12 Claims, 1 Drawing Sheet

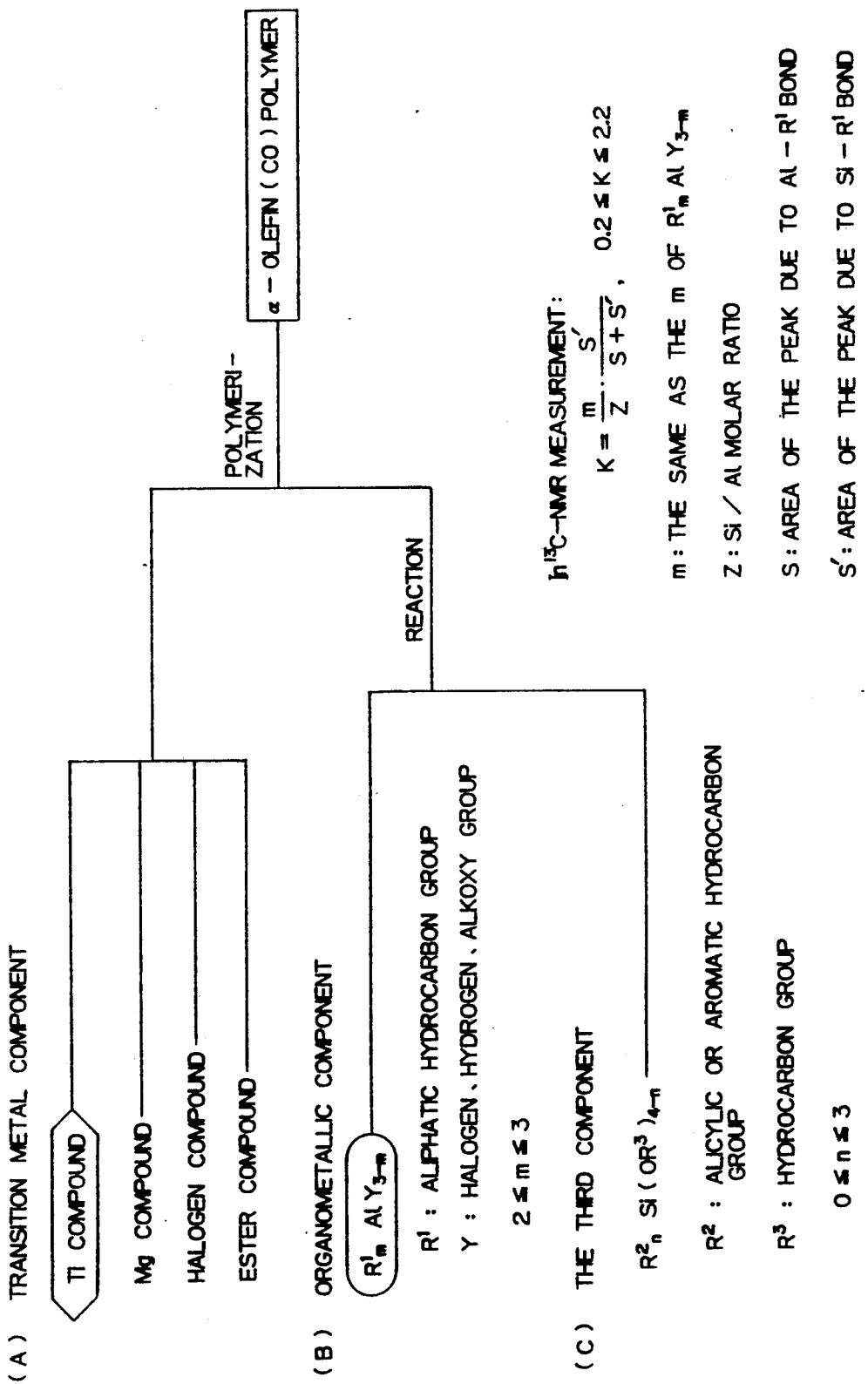

PROCESS FOR PRODUCING α-OLEFIN POLYMERS

This application is a continuation of application Ser. No. 07/433,219 filed Nov. 8, 1989, now abandoned.

BACKGROUND OF THE INVENTION

1. Field of the Invention

This invention relates to a co-catalyst component used in the production of α-olefin polymer, and more particularly to a process for producing an α-olefin polymer quite low in the contents of catalyst residue and amorphous polymer and excellent in mechanical properties and processability which comprises using a catalyst system comprising a solid catalyst component containing at least magnesium, titanium, halogen and ester compound and a specified co-catalyst component.

2. Description of the Prior Art

As the method for producing a polymer of α-olefin such as propylene, butene-1 and the like, the method using the so-called Ziegler-Natta catalyst comprising a compound of transition metal belonging to Group IV-VI of the periodic table and an organometallic compound of a metal belonging to Group I-III of the periodic table is well known. Particularly in the industrial production of α-olefin polymers, solid catalysts such as titanium type catalyst comprising titanium trichloride as transition metal compound and titanium-magnesium composite catalyst are widely used today.

In the titanium trichloride type solid catalyst, halogen-containing aluminum compound such as diethylaluminum chloride is used as the organometallic compound of the co-catalyst. In such a polymerization process, catalyst residue such as halogen originated from co-catalyst remains in the formed α-olefin polymer, which makes various troubles on stability, processability, etc. of the resulting α-olefin polymer. Accordingly, a particular equipment must be provided for removing the catalyst residue and stabilizing the polymer.

This disadvantage can be overcome either by enhancing catalyst activity expressed by the weight of resulting α-olefin polymer per unit weight of catalyst or by using a catalyst containing a small amount of element making the cause of catalyst residue. By taking these measures, the above-mentioned equipment for removing catalyst residue can be made unnecessary and production cost of α-olefin polymer can be reduced.

On the other hand, in the case of titaniummagnesium composite solid catalyst, there is used a ternary catalyst system to which are separately added a halogen-free organoaluminum compound such as triethylaluminum as organometallic compound of co-catalyst and an electron donor for improving stereospecificity of resulting α-olefin polymer In such a polymerization process, no halogen originated from co-catalyst is contained in the resulting α-olefin polymer However, such a catalyst is insufficient in catalytic activity, so that a catalyst residue originated from solid catalyst remains in the polymer. That is to say, the above-mentioned problems are not completely solved in this process, too.

Further, in any of the above-mentioned solid catalysts, production of α-olefin polymer is accompanied by formation of amorphous polymer as a by-product in addition to the highly stereospecific α-olefin polymer having a high industrial value. This amorphous polymer is poor in industrial value, and it exercises greatly adverse influences upon the mechanical properties of processed articles, such as film, fiber and the like, of the α-olefin polymer. In addition, the formation of the amorphous polymer results in a loss of starting monomer, and the formation of amorphous polymer necessitates to provide a particular equipment for removing the amorphous polymer, which is quite disadvantageous from the industrial point of view. Thus, the catalyst system used in the production of α-olefin polymer must be a catalyst system which yields no amorphous polymer at all or yields only a very slight quantity of amorphous polymer.

SUMMARY OF THE INVENTION

It is the object of this invention to provide a process for producing α-olefin polymers by the use of an olefin polymerizing catalyst system having so high a catalytic activity and stereospecificity as to make the removal of catalyst residue and amorphous polymer unnecessary.

This invention provides a process for producing α-olefin polymers which comprises polymerizing α-olefin by the use of a catalyst system comprising independent three components, i.e. a titanium-magnesium type composite solid catalyst component, an organo-aluminum component and an electron donor component, said organoaluminum component and said electron donor component being reacted together and put to use in the form of a reaction product of a specified state. This invention is characterized by satisfying the following conditions:

Thus, it is a process for producing α-olefin polymers which comprises homopolymerizing or copolymerizing an α-olefin by the use of a catalyst system comprising:

(A) a solid catalyst component (A) containing at least magnesium, titanium, halogen and ester compound as indispensable components, and (B) a catalyst component (B) produced by reacting an organoaluminum compound represented by general formula $R^1{}_m AlY_{3-m}$ ($R^1$ represents an aliphatic hydrocarbon group having 1 to 8 carbon atoms, Y represents halogen, hydrogen or alkoxy group having 1 to 20 carbon atoms, and m represents a number satisfying $2 \leq m \leq 3$) with an organic silicon compound represented by general formula $R^2{}_n Si(OR^3)_{4-n}$ ($R^2$ represents alicyclic hydrocarbon group or aromatic hydrocarbon group having 5 to 20 carbon atoms, $R^3$ represents a hydrocarbon group having 1 to 20 carbon atoms, and n represents a number satisfying $0 \leq n \leq 3$) in the state of a solution so that the product of this reaction becomes satisfying the following formula:

$$0.2 \leq K \leq 2.2$$

wherein $$K = \frac{m}{Z} \cdot \frac{S'}{S + S'}$$

[S represents the area of a peak in $^{13}$C-NMR spectrum of the reaction product assignable to Al-$R^1$ bond, S' represents the area of a peak in $^{13}$C-NMR of the product assignable to the Si-$R^1$ bond formed by the reaction with organoaluminum compound, and Z represents molar ratio of Si atom to Al atom in component (B)].

The use of the catalyst system of this invention brings about the following effects:

(1) Since the catalytic activity per solid catalyst and per titanium atom is very high, the contents of halogen atom and titanium atom closely related to colorization, stability and corrosion behavior of polymer are very low, even if no particular treatment is effected for removing catalyst residue That is, the equipment for removing catalyst residue is unnecessary, and production cost of olefin polymer can be reduced.

(2) Since the decrease in catalytic activity and stereospecificity in the lapse of time is very small, production of polymer per unit catalyst quantity can be enhanced by prolonging the polymerization time.

(3) By the use of the catalyst system of this invention, an α-olefin polymer having a very high stereospecificity can be produced. Accordingly, the quantity of amorphous polymer formed as by-product is very small, and therefore an α-olefin polymer excellent in mechanical properties can be produced without removing amorphous polymer.

(4) Since formation of low-stereospecificity polymer soluble in polymerization solvent is very small, problems in process, such as deposition of polymer onto reactor, pipings and flush hopper, do not appear. Further, since formation of soluble polymer is very small, the starting monomer can be utilized effectively.

BRIEF DESCRIPTION OF THE DRAWING

FIG. 1 is a flow chart diagram for facilitating the understanding of this invention.

This flow chart diagram is nothing other than one typical example of the embodiments of this invention, and this invention is by no means limited by it.

DESCRIPTION OF THE PREFERRED EMBODIMENTS

(a) Solid catalyst component (A)

As the solid catalyst component (A) comprising at least magnesium, titanium, halogen and ester compound used in this invention, the so-called titanium-magnesium composite catalyst can be used.

As the method for producing such solid catalyst component, the methods disclosed in Japanese Patent Publication Nos. 52-39431 (U.S.Pat. No. 4107413) and 52-36786 (U.S. Pat. No. 4157435) and Japanese Patent Application Kokai (Laid-Open) (hereinafter referred to as JP-A) Nos. 54-94590, 55-36203, 56-41206, 57-63310 (EP 0045975), 57-59916 (EP 0049436), 58-83006 (GB 2111066), 61- 218606 (U.S. Pat. No. 4672050), etc. can be referred to. Examples of these methods include the followings:

(1) A method which comprises pulverizing magnesium halide and/or alkoxymagnesium compound in the presence of an ester compound and thereafter treating it with a titanium compound such as $TiCl_4$ or the like.

(2) A method which comprises dissolving magnesium halide and/or alkoxymagnesium compound into alcohol or ether, and thereafter treating the resulting solution with a titanium compound such as $TiCl_4$ and the like and an ester compound (JP-A 58-83006) (Example 4 mentioned later).

(3) A method which comprises reducing an alkoxytitanium compound with an organomagnesium compound such as Grignard reagent in the presence of an organic silicon compound having Si-O bond to obtain a solid product, and treating the product with an ester compound and a mixture of an ether compound and $TiCl_4$ (JP-A 61-218606) (Examples 1, 2, 6 and 7 mentioned later).

Said solid catalyst component (A) may be supported on a known porous material such as silica gel, porous polymer beads, and the like. As concrete examples of this process, those disclosed in JP-A 61-21109, 62-256802, 63-289004, etc. can be referred to. Examples of these methods include the followings:

(1) A method which comprises treating silica gel with an organomagnesium compound such as Grignard reagent or the like, then reacting it with a halogenating agent and/or an alcohol, and thereafter treating the product with an ester and a titanium compound such as $TiCl_4$ or the like (JP-A 61-21109) (Example 5 mentioned later).

(2) A method which comprises reducing an alkoxytitanium compound with an organomagnesium compound such as Grignard reagent or the like in the presence of silica gel or porous polymer beads and an organic silicon compound having Si-O bond to obtain a solid product, and treating the product with an ester compound and a mixture of an ether compound and $TiCl_4$ (JP-A 63-289004) (Example 3 mentioned later).

The titanium compounds which can be used for the synthesis of solid catalyst component (A) of this invention are represented by the following general formula:

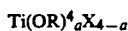

$$Ti(OR)^4{}_aX_{4-a}$$

wherein $R^4$ represents hydrocarbon group having 1 to 20 carbon atoms, X represents halogen atom, and a represents a number satisfying $0 \leq a \leq 4$. Concrete examples of said titanium compound include titanium tetrachloride, ethoxytitanium trichloride, butoxytitanium trichloride, phenoxytitanium trichloride, dibutoxy-titanium dichloride, diphenoxytitanium dichloride, tributoxytitanium chloride, tetraethoxytitanium, tetrabutoxytitanium, tetraphenoxytitanium and the like.

As the magnesium compound, the followings can be used.

As reductive compound having magnesium-carbon bond or magnesium-hydrogen bond, diethylmagnesium, dibutylmagnesium, dihexylmagnesium, ethylmagnesium chloride, butylmagnesium chloride, hexylmagnesium chloride, butylethoxymagnesium, butylmagnesium hydride and the like can be used preferably. These magnesium compounds may be used in the form of a complex compound with organoaluminum compound. On the other hand, as nonreductive magnesium compound, magnesium dihalides such as magnesium dichloride, magnesium dibromide and the like; alkoxymagnesium compounds such as methoxymagnesium chloride, ethoxymagnesium chloride, butoxymagnesium chloride, phenoxymagnesium chloride, diethoxymagnesium, dibutoxymagnesium, diphenoxymagnesium and the like; and magnesium carboxylates such as magnesium laurate, magnesium stearate and the like can be used preferably These non-reductive magnesium compounds may be those which have been synthesized from reductive magnesium compounds either previously or at the time of preparation of solid catalyst.

As the ester compound, mono- and poly-basic carboxylic esters such as aliphatic carboxylic esters, olefinic carboxylic esters, alicyclic carboxylic esters and aromatic carboxylic esters are used. Concrete examples of said ester compound include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate, diphenyl phthalate and the like.

(b) Organoaluminum compound

The organoaluminum compound used for preparation of catalyst component (B) of this invention, prepared by reacting an organoaluminum compound and an organic silicon compound, is represented by the following general formula:

$$R^1_m AlY_{3-m}$$

wherein $R^1$ represents aliphatic hydrocarbon group having 1 to 8 carbon atoms, Y represents halogen, hydrogen or alkoxy group having 1 to 20 carbon atoms, and m represents a number satisfying $2 \leq m \leq 3$.

Concrete examples of said organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; dialkylaluminum alkoxides such as diethylaluminum methoxide, diethylaluminum ethoxide, diethylaluminum propoxide, diisobutylaluminum methoxide, diisobutylaluminum ethoxide and the like; mixture of trialkylaluminum and dialkylaluminum halide; and mixture of trialkylaluminum and dialkylaluminum alkoxide.

Among these organoaluminum compounds, those represented by general formula $Et_m AlY_{3-m}$ (Et is ethyl group and m represents a number satisfying $2 \leq m \leq 3$) are preferable, and triethylaluminum is particularly preferable.

(c) Organic silicon compound

The organic silicon compounds used for preparation of catalyst component (B) of this invention are represented by general formula $R^2_n Si(OR^3)_{4-n}$ ($R^2$ represents alicyclic hydrocarbon group or aromatic hydrocarbon group having 5 to 20 carbon atoms, $R^3$ represents hydrocarbon group having 1 to 20 carbon atoms, and n represents a number satisfying $0 \leq n \leq 3$).

Concrete examples of said organic silicon compound include tetramethoxysilane, tetraethoxysilane, tetrabutoxysilane, tetrapropoxysilane, tetraisopropoxysilane, tetraphenoxysilane, cyclohexyltrimethoxysilane, cyclohexyltriethoxysilane, phenyltrimethoxysilane, phenyltriethoxysilane, dicyclohexyldimethoxysilane, dicyclohexyldiethoxysilane, diphenyldimethoxysilane, diphenyldiethoxysilane, and the like. Among these organic silicon compounds, cyclohexyltrimethoxysilane and phenyltrimethoxysilane are preferable.

(d) Preparation of catalyst component (B)

The catalyst component (B) of this invention is prepared by reacting the above-mentioned organoaluminum compound and organic silicon compound in the state of a solution.

This reaction is carried out in an atmosphere of inert gas such as nitrogen, argon and the like.

This reaction is carried out in the state of a solution. The reaction may be carried out either in the absence of solvent or in the presence of solvent. Preferably, the reaction is carried out in the presence of solvent, because of easiness of procedure.

The solvents which can be used for this reaction include aliphatic hydrocarbons such as hexane, heptane, octane, decane and the like; aromatic hydrocarbons such as toluene, xylene and the like; alicyclic hydrocarbons such as cyclohexane, methylcyclohexane, decalin and the like; and ether compounds such as diethyl ether, dibutyl ether, diisoamyl ether, tetrahydrofuran and the like.

The reaction temperature is $-50°$ C. to $200°$ C., preferably $-30°$ C. to $120°$ C., and particularly $-25°$ C. to $100°$ C.

The reaction time is not critical so far as K value [definition of K will be detailed in paragraph (e)] satisfies $0.2 \leq K \leq 2.2$. Generally speaking, reaction time is dependent on reaction temperature. As reaction temperature rises, reaction time generally becomes shorter. The reaction is usually carried out over a period of 30 minutes to about 100 days. Preferably, after practising the reaction at the predetermined temperature for a predetermined period of time, the reaction product is kept at a temperature lower than the reaction temperature, which is desirable from the viewpoint of preventing excessive progress of the reaction. Usually, the product is kept at a temperature at least $20-60°$ C. lower than the reaction temperature.

The organic silicon compound is used in an amount of 0.01 to 5 moles, preferably 0.03 to 3 moles, and particularly 0.05 to 1.0 mole, per one mole of aluminum atom.

The amount of organoaluminum compound contained in the catalyst component (B) thus obtained to be used in polymerization can be selected from the range of 1 to 1,000 moles, and particularly 5 to 600 moles, per one mole of titanium atom in the solid catalyst.

(e) Calculation of K value

K is expressed by the following formula:

$$K = \frac{m}{Z} \cdot \frac{S'}{S + S'}$$

wherein m is identical with the m in the organoaluminum compound represented by general formula $R^1_m AlY_{3-m}$ used for preparation of catalyst component (B); Z is molar ratio of Si atom to Al atom contained in catalyst component (B); and S and S' are areas of the spectrums assigned to Al-$R^1$ bond and Si-$R^1$ bond formed by reaction with organoaluminum compound, respectively, of catalyst component (B) measured by $^{13}$C-NMR ($R^1$ represents aliphatic hydrocarbon group having 1 to 8 carbon atoms).

Even if it is the same aliphatic hydrocarbon group $R^1$, $R^1$ linked to Al atom and $R^1$ linked to Si atom are different from each other in the chemical shift of $^{13}$C-NMR peak. When a hydrocarbon group is linked to Si atom, aliphatic hydrocarbon group and alicyclic or aromatic hydrocarbon group are different from each other in the chemical shift of $^{13}$C-NMR spectrum (the peak of alicyclic and aromatic hydrocarbon groups appears in a lower magnetic field region than peak of aliphatic hydrocarbon group). By utilizing this fact, K value can be determined from S and S'.

Chemical shift of Al-$R^1$ bond in catalyst component (B) in $^{13}$C-NMR can be determined by carrying out measurement by using $R^1_m AlY_{3-m}$ as standard sample. Chemical shift of Si-$R^1$ bond in $^{13}$C-NMR can be determined by carrying out measurement by using $R^2_n(R^1)Si(OR^3)_{3-n}$ ($R^2$ represents alicyclic hydrocarbon group or aromatic hydrocarbon group having 5-20 carbon atoms, $R^3$ represents hydrocarbon group having 1-20 carbon atoms, and n represents a number satisfying $0 \leq n \leq 3$) as a standard sample.

Hereunder, the method for determining S and S' will be concretely explained by referring to a case when $R^1$ is ethyl group as an example. When an organoaluminum compound having ethyl group and an organic silicon compound having ethyl group are subjected to 13C-NMR measurement, the peaks appearing at chemical shifts of 0.4-1.2 ppm, 8.6-9.2 ppm, 4.1-5.1 ppm and 5.7-6.9 ppm (delta scale, lower magnetic field side with regard to TMS standard) are due to $CH_2(Al)$, $CH_3(Al)$, $CH_2(Si)$ and $CH_3(Si)$, respectively, and their chemical shifts hardly change even if the organoaluminum compound and the organic silicon compound coexist, as mentioned in VAEHAESARJA et al, Journal of Polymer Science: Part A, Vol. 25, 3241-3253 (1987). Accordingly, S can be determined by summing the peak areas of $CH_2(Al)$ and $CH_3(Al)$, and S' can be determined by summing the peak areas of $CH_2(Si)$ and $CH_3(Si)$.

The $^{13}$C-NMR measurement may be carried out in the usual manner.

Concretely speaking, catalyst component (B) is sealed into an NMR measuring tube in an atmosphere of nitrogen, and measurement is carried out at 20 to 30° C. at a pulse angle of 45°, pulse interval of 5 seconds and integration number of 2,000 or more (Fourier transformation is carried out by every 40 integration, and the transformation is repeated 50 times or more).

Concretely, the K value thus determined is considered an index roughly expressing the number of $R^1$ groups in organoaluminum having transferred to organic silicon compound.

According to this invention, K must be a value not smaller than 0.2 and not greater than 2.2, and a particularly desirable effect can be brought about when K is not smaller than 0.3 and not greater than 2.0.

(f) Method for polymerizing α-olefin

The method for feeding the catalyst components into polymerization reactor is not critical, so long as they are fed in an inert gas such as nitrogen or argon and in a water-free state.

Catalyst components (A) and (B) may be fed separately or after a provious mutual contact.

The polymerization can be effected over a temperature range of −30° C. to 200° C. However, in the low temperature region lower than 0° C., the polymerization velocity decreases, while at high temperatures higher than 100° C., no polymer having a high stereo-specificity can be obtained. Preferably, therefore, the polymerization is carried out at a temperature ranging from 0° C. to 100° C. Although polymerization pressure is not critical, a pressure of about 3 to 100 atmospheres is preferable from the viewpoint of industrial practicability and economicity. The polymerization may be carried out by any of batch system and continuous system. Slurry polymerization using an inert hydrocarbon solvent such as propane, butane, pentane, hexane, heptane and octane, liquid phase polymerization using no solvent and gas phase polymerization are also adoptable.

Next, the alpha-olefins to which this invention is applicable are those having 3 or more carbon atoms. Concrete examples of the α-olefin include propylene, butene-1, pentene-1, hexene-1, 3-methylpentene-1, 4-methyl-pentene-1 and the like, though this invention is by no means limited by these compounds. The polymerization of this invention may be any of homopolymerization and copolymerization including copolymerizations with ethylene. In the copolymerization, two or more kinds of olefins are mixed together and contacted with catalyst, whereby a copolymer is obtained.

Heteroblock copolymerization wherein polymerization is carried out in two or more steps can also be carried out easily.

It is also possible to add a chain transfer agent such as hydrogen or the like for the purpose of regulating molecular weight of polymer.

Next, this invention will be illustrated in more detail by way of the following examples and comparative examples.

EXAMPLE 1

(a) Synthesis of organomagnesium compound

After replacing the inner atmosphere of a one liter flask equipped with a stirrer, a reflux condenser, a dropping funnel and a thermometer with argon gas, 32.0 g of sliced metallic magnesium for Grignard reaction was charged into the flask. Then, 120 g of butyl chloride and 500 ml of dibutyl ether were charged into the dropping funnel, and about 30 ml of the mixture was dropped onto the magnesium in the flask to start the reaction. After starting the reaction, the dropping was continued at 50° C. over a period of 4 hours. After dropping it, the reaction was continued at 60° C. for an additional one hour. Then, the reaction mixture was cooled to room temperature, and the solid material was filtered off.

The butylmagnesium chloride present in the dibutyl ether was hydrolyzed with 1N sulfuric acid and back-titrated with 1N aqueous solution of sodium hydroxide to determine its concentration, by using phenolphthalein as indicator. As the result, its concentration was 2.1 mole/liter.

(b) Synthesis of solid product

After replacing the inner atmosphere of a 500 ml flask equipped with a stirrer and a dropping funnel with argon gas, 240 ml of hexane, 5.4 g (15.8 mmoles) of tetrabutoxytitanium and 61.4 g (295 mmoles) of tetra-ethoxysilane were charged and made into a uniform solution. Then, 150 ml of the organomagnesium compound synthesized in (a) was slowly dropped into the flask from the dropping funnel over a period of 4 hours, while keeping the inner temperature of the flask at 5° C. After dropping it, the resulting mixture was stirred at room temperature for one hour, and solid matter was separated from liquid at room temperature. The solid thus obtained was thrice washed with each 240 ml portion of hexane and then dried under reduced pressure to obtain 45.0 g of a brown colored solid product.

The solid product thus obtained contained 1.7% by weight of titanium atom, 33.8% by weight of ethoxy group and 2.9% by weight of butoxy group.

In the wide angle X ray (Cu-Kα ray) diffraction pattern of this solid product, no clear diffraction pattern was observable at all, demonstrating its amorphous structure.

(c) Synthesis of ester-treated solid

After replacing the inner atmosphere of a 100 ml flask with argon gas, 6.5 g of the solid product synthesized in (b), 16.2 ml of toluene and 4.8 ml (16 mmoles) of diisobutyl phthalate were charged and reacted at 95° C. for one hour.

After the reaction, solid matter was separated from liquid and thrice washed with each 33 ml portion of toluene.

(d) Synthesis of solid catalyst component (A)

After completing the washing step of (c), 16.2 ml of toluene, 0.36 ml (1.3 mmoles) of diisobutyl phthalate, 2.2 ml (13 mmoles) of n-butyl ether and 38.0 ml (346 mmoles) of titanium tetrachloride were charged into the flask and reacted at 95° C. for 3 hours. After the reaction, solid matter was separated from liquid at 95° C. and twice washed with each 33 ml portion of toluene at that temperature. Then, the above-mentioned treatment using diisobutyl phthalate and mixture of n-butyl ether and titanium tetrachloride was repeated once more under the same conditions as above, and the treated product was thrice washed with each 33 ml portion of hexane to obtain 5.0 g of an ocher colored solid catalyst.

The solid catalyst component (A) thus obtained contained 2.1% by weight of titanium atom, 19.9% by weight of magnesium atom and 12.7% by weight of phthalic ester.

(e) Preparation of catalyst component (B)

After replacing the inner atmosphere of a 100 ml flask equipped with a stirrer with argon gas, 41.7 ml of heptane, 5.74 g (50 mmoles) of triethylaluminum and 1.49 g (7.5 mmoles) of phenyltrimethoxysilane were charged and reacted at 60° C. for 4 hours with stirring.

After the reaction, about 2 ml of the reacted solution was sealed into an ampoule for NMR measurement having a diameter of 5 mm of which inner atmosphere had been replaced with nitrogen. Using this ample $^{13}$C-NMR spectrum was measured under the following conditions: 30° C., pulse angle 45°, pulse interval 5 seconds, integration number 2,000 (Fourier transformation was carried out by every 40 integrations, and it was repeated 50 times). K value was determined from the spectrum thus obtained. As the result, K was equal to 1.06.

(f) Polymerization of propylene

After replacing the inner atmosphere of a 3 liter agitation type stainless steel autoclave with argon gas, 2.6 ml of the solid catalyst component (B) solution synthesized in (e) and 8.8 mg of the solid catalyst component (A) synthesized in (d) were charged, and hydrogen was introduced until its partial pressure reached 0.33 kg/cm$^2$. Then, 780 g of liquefied propylene was charged. Temperature of autoclave was elevated to 80° C., and polymerization was carried out at 80° C. for 2 hours. After completion of the polymerization, the unreacted monomer was purged. The resulting polymer was dried at 60° C. for 2 hours under reduced pressure to obtain 285 g of a powdery polypropylene.

Accordingly, yield (g) of polypropylene per one gram of solid catalyst component (A) (hereinafter, referred to as "PP/cat") was equal to 32,400. The proportion (% by weight) of cold xylene-soluble fraction in the total polymer yield (hereinafter, referred to as "CXS") was equal to 1.2. Bulk density (g/ml) of the powdery polypropylene (hereinafter, referred to as "BD") was equal to 0.44.

EXAMPLE 2

(a) Preparation of catalyst component (B)

Catalyst component (B) was prepared in the same manner as in Example 1 (e), except that the reaction time was altered to 6 hours. Measurement of $^{13}$C-NMR revealed that K was equal to 1.78.

(b) Polymerization of propylene

Polymerization of propylene was carried out in the same manner as in Example 1(f), except that catalyst component (B) prepared in Example 2 (a) was used. Results of the polymerization were as follows: PP/cat=40,200, CXS=1.4, BD=0.44.

Comparative Example 1

(a) Preparation of component (B)

Catalyst component (B) was prepared in the same manner as in Example 1 (e), except that the catalyst component (B) prepared at 25° C. according to Example 1 (e) was immediately used for measurement of $^{13}$C-NMR and polymerization of propylene. $^{13}$C-NMR measurement revealed that no peak due to Si-Et bond was noticeable, and K was equal to zero.

(b) Propylene was polymerized in the same manner as in Example 1 (f), except that catalyst component (B) prepared in comparative Example 1 (a) was used. Results of the polymerization were as follows: PP/cat=22,100, CXS=1.5, BC=0.44. Since K value of the used catalyst component (B) was equal to zero which is smaller than 0.2, the catalytic activity was much lower than ion Examples 1 and 2.

COMPARATIVE EXAMPLE 2

(a) Preparation of catalyst component (B)

Catalyst component (B) was prepared in the same manner as in Example 1 (e), except that reaction time was altered to 10 hours. $^{13}$C-NMR measurement revealed that K=2.30.

(b) Polymerization of propylene

Propylene was polymerized in the same manner as in Example 1 (f), except that catalyst component (B) prepared in Comparative Example 2 (a) was used. Results of the polymerization were as follows: PP/cat=20,000, CXS=6.4, BD=0.40. Since the catalyst component (B) used in this polymerization had a K value of 2.30 which is greater than 2.2, activity and stereospecificity were much lower than in Examples 1 and 2.

EXAMPLE 3

(a) Synthesis of solid product

After replacing the inner atmosphere of a 200 ml flask equipped with a stirrer and a dropping funnel with argon gas, 6.98 g of styrene-divinylbenzene copolymer (dvp=0.51 cc/g, wherein dvp expresses pore volume in the pore radius range of 200 to 2,000 angstroms) which had been dried under reduced pressure at 80° C. for one hour was charged together with 35.0 m of n-heptane, 0.64 g (1.9 mmoles) of tetrabutoxytitanium and 6.70 g (32.1 mmoles) of tetraethoxysilane, and the resulting mixture was stirred at 30° C. for 45 minutes.

Then, 16.9 ml of the organomagnesium compound synthesized in Example 1 (a) was dropped from the dropping funnel over a period of one hour, while keeping inner temperature of the flask at 5° C. After dropping it, the resulting mixture was stirred at 5° C. for 45 minutes and then at 30° C. for 45 minutes, and then the product was thrice washed with each 35 ml portion of n-heptane and dried under reduced pressure to obtain 12.4 g of a brown colored solid product.

The solid product thus obtained contained 0.47% by weight of titanium atom and 4.0% by weight of magnesium atom.

(b) Synthesis of solid catalyst component (A)

After replacing the inner atmosphere of a 100 ml flask with argon gas, 4.58 g of the solid product synthesized in the reduction of (a), 15.3 ml of toluene and 1.40 ml (5.23 mmoles) of diisobutyl phthalate were charged and reacted at 95° C. for one hour.

After the reaction, solid matter was separated from liquid and twice washed with each 15.3 ml portion of toluene.

After washing it, 15.3 ml of toluene, 1.01 ml (5.97 mmoles) of n-butyl ether and 17.9 ml (163 mmoles) of titanium tetrachloride were added to the flask and reacted at 95° C. for 3 hours. After the reaction, solid matter was separated from liquid at 95° C. and twice washed with each 15.3 ml portion of toluene at that temperature. Then, the above-mentioned treatment using a mixture of n-butyl ether and titanium tetrachloride was repeated once more over a period of one hour, and the treated product was twice washed with each 15.3 ml portion of n-heptane and dried under reduced pressure to obtain 3.68 g of a brown colored solid catalyst component (A).

The solid catalyst component (A) contained 0.49% by weight of titanium atom, 5.4% by weight of magnesium atom and 1.5% by weight of phthalic ester.

(c) Polymerization of propylene

Propylene was polymerized in the same manner as in Example 2 (b), except that the solid catalyst component (A) prepared in (b) of this example was used. Results of the polymerization were as follows: PP/cat=8,240, CXS=1.8, BD=0.42.

COMPARATIVE EXAMPLE 3

Polymerization of propylene

Propylene was polymerized in the same manner as in Example 3 (c), except that the catalyst component (B) prepared in Comparative Example 1 (a) was used. Results of the polymerization were as follows PP/cat=4,140, CXS=1.9, BD=0.42. Since the catalyst component (B) used in this polymerization had a K value of zero which is smaller than 0.2, activity was much lower than in Example 3.

EXAMPLE 4

(a) Synthesis of solid catalyst component (A)

A suspension was prepared by reacting 47.6 g (500 mmoles) of anhydrous magnesium chloride, 250 ml of decane and 234 ml (1,500 mmoles) of 2-ethylhexyl alcohol at 130° C. for 2 hours. Then, 11.1 g (75 mmoles) of phthalic anhydride was added to the suspension and stirred and homogenized at 130° C. for an additional one hour to dissolve the phthalic anhydride into the suspension. The homogeneous solution thus obtained was cooled to room temperature, and then it was dropwise added into 200 ml (18 moles) of titanium tetrachloride kept at −20° C. over a period of one hour. After adding it, temperature of the resulting mixture was elevated to 110° C. in 4 hours, and when it had reached 110° C., 28.0 ml (140 mmoles) of diisobutyl phthalate was added. The resulting mixture was stirred at that temperature for 2 hour. After reacting it for 2 hours, solid matter was collected by filtration while it was hot, and then it was again suspended into 2,000 ml of titanium tetrachloride and again reacted at 110° C. for 2 hours. After the reaction, the solid matter was collected by filtration while it was hot, and then it was washed 5 times with each 300 ml portion of decane at 110° C. and thereafter thrice with each 500 ml portion of hexane at room temperature and dried under reduced pressure to obtain solid catalyst component (A). The solid catalyst contained 2.0% by weight of titanium atom, 20.0% by weight of magnesium atom and 4.2% by weight of diisobutyl phthalate.

(b) Polymerization of propylene

Propylene was polymerized in the same manner as in Example 2 (b), except that the solid catalyst component (A) synthesized in (a) of this example was used. Results of the polymerization were as follows: PP/cat=44,600, CXS=4.4, BD=0.36.

COMPARATIVE EXAMPLE 4

Polymerization of propylene

Propylene was polymerized in the same manner as in Example 4 (b), except that the catalyst component (B) prepared in Comparative Example 1 (a) was used. Results of the polymerization were as follows: PP/cat=20,800, CXS=4.1, BD=0.36. Since the catalyst component (B) used in this polymerization had a K value of zero which is smaller than 0.2, activity was much lower than in Example 4.

EXAMPLE 5

(a) Synthesis of solid catalyst component (A)

The inner atmosphere of a 200 ml flask equipped with a dropping funnel and a stirrer was replaced with nitrogen gas. Into this flask, 8.6 g of silicon oxide (manufactured by DAVISON, trade name G-952, specific surface area 302 m²/g, pore volume 1.54 m²/g, mean pore radius 204 angstroms) (hereinafter, this silicon oxide is referred to as SiO$_2$) which had been calcined at 800° C. for 7 hours under a stream of nitrogen gas was charged together with 40 ml of n-heptane. Then, 34.4 ml of 20% solution of n-butylethylmagnesium (hereinafter referred to as BEM) in n-heptane (46.1 mmoles as BEM itself) (manufactured by Texas Alkyls Co., trade name MAGALA BEM) was added and the resulting mixture was stirred at 90° C. for 2 hours. After removing the supernatant by decantation, the solid product was washed with 70 ml of n-heptane at room temperature and the supernatant was removed by decantation. This washing with n-heptane was repeated further 4 times and then it was dried under reduced pressure to obtain 9.83 g of BEM-treated silica gel. After replacing the inner atmosphere of a 100 ml flask equipped with a stirrer with nitrogen gas, 2.37 g of the BEM-treated silica gel obtained above and 15 ml of n-heptane were charged into the flask to prepare a suspension. Then, a solution of 4.0 g (27 mmoles) of 2,2,2-trichlorethanol dissolved in 5 ml n-heptane was dropwise added thereto from the dropping funnel at 0° C. over a period of 20 minutes. After stirring the resulting mixture at 0° C. for one hour, temperature was elevated to 80° C. in one hour, and then the mixture was stirred at this temperature for one hour. After the reaction, the product was washed at room temperature twice with each 20 ml portion of n-heptane and thereafter thrice with each 20 ml portion of toluene.

Then, 8.3 ml of toluene and 0.25 g of di-n-butyl phthalate were added and reacted at 50° C. for 2 hours. Then, 12.5 ml of titanium tetrachloride was added and reacted at 90° C. for 2 hours, and the product was twice washed with each 20 ml portion of toluene at 90° C. Then 8.3 ml of toluene and 12.5 ml of titanium tetrachloride were added and reacted at 90° C. for 2 hours. Then, the product was six times washed with each 20 ml portion of n-hexane and dried under reduced pressure to obtain 2.25 g of solid catalyst component (A).

This solid catalyst component (A) contained 3.1% by weight of titanium atom, 4.4% by weight of magnesium atom and 3.2% by weight of di-n-butyl phthalate.

(b) Polymerization of propylene

Propylene was polymerized in the same manner as in Example 2 (b), except that the solid catalyst component (A) synthesized in (a) of this example was used. Results of the polymerization were as follows: PP/cat=7,060, CXS=2.4, BD=0.40.

COMPARATIVE EXAMPLE 5

Polymerization of propylene

Propylene was polymerized in the same manner as in Example 5 (b), except that the catalyst component (B) prepared in Comparative Example 1 (a) was used. Results of the polymerization were as follows: PP/cat=3,700, CXS=2.5, BD=0.39. Since the catalyst component (B) used in this polymerization had a K value of zero which is smaller than 0.2, activity was much lower than in Example 5.

EXAMPLE 6

(a) Preparation of catalyst component (B)

After replacing the inner atmosphere of a 200 ml flask equipped with a stirrer with argon gas, 83.3 ml of heptane, 11.4 g (100 mmoles) of triethylaluminum and 3.06 g (15 mmoles) of cyclohexyltrimethoxysilane were charged and reacted at 60° C. for one hour with stirring. $^{13}$C-NMR was measured on this sample, from which K value was calculated. As the result, K was equal to 0.46.

(b) Polymerization of propylene

Propylene was polymerized in the same manner as in Example 1 (f), except that the catalyst component (B) prepared in (a) of this example was used. Results of the polymerization were as follows: PP/cat=28,000, CXS=1.2, BD=0.43.

EXAMPLE 7

(a) Preparation of catalyst component (B)

Catalyst component (B) was prepared in the same manner as in Example 6 (a), except that reaction time was altered to 2 hours. $^{13}$C-NMR measurement revealed that K was equal to 0.98.

(b) Polymerization of propylene

Propylene was polymerized in the same manner as in Example 1 (f), except that the catalyst component (B) prepared in (a) of this example was used. Results of the polymerization were as follows: PP/cat=38,200, CXS=1.3, BD=0.43.

COMPARATIVE EXAMPLE 6

(a) Preparation of catalyst component (B)

Catalyst component (B) was prepared in the same manner as in Example 6 (a), except that catalyst component (B) prepared according to Example 6 (a) at 25° C. was immediately used in $^{13}$C-NMR measurement and polymerization of propylene.

$^{13}$C-NMR measurement revealed that no peak due to Si-Et bond was observable at all, and K was equal to zero.

(b) Polymerization of propylene

Propylene was polymerized in the same manner as in Example 6 (b), except that the catalyst component (B) prepared in (a) of this example was used. Results of the polymerization were as follows: PP/cat=24,600, CXS=1.4, BD=0.43. Since the catalyst component (B) used in this polymerization had a K value of zero which is smaller than 0.2, activity was much lower than in Examples 6 and 7.

COMPARATIVE EXAMPLE 7

(a) Preparation of catalyst component (B)

Catalyst component (B) was prepared in the same manner as in Example 6 (a), except that reaction time was altered to 8 hours. $^{13}$C-NMR measurement revealed that K was equal to 2.43.

(b) Polymerization of propylene

Propylene was polymerized in the same manner as in Example 6 (b), except that the catalyst component (B) prepared in (a) of this example was used. Results of the polymerization were as follows: PP/cat=20,000, CXS=5.9, BD=0.43. Since the catalyst component (B) used in this polymerization had a K value of 2.43 which is greater than 2.2, activity and stereospecificity were much lower than in Examples 6 and 7.

What is claimed is:

1. A process for producing an α-olefin polymer which comprises homopolymerizing or copolymerizing an α-olefin by the use of a catalyst system comprising:
 (A) a solid catalyst component (A) containing at least magnesium, titanium, halogen and ester compound as indispensable components, and
 (B) a catalyst component (B) produced by reacting an organoaluminum compound represented by general formula $R^1{}_m AlY_{3-m}$ ($R^1$ represents an aliphatic hydrocarbon group having 1 to 8 carbon atoms, Y represents halogen, hydrogen or alkoxy group having 1 to 20 carbon atoms, and m represents a number satisfying $2 \leq m \leq 3$) with an organic silicon compound represented by general formula $R^2{}_n Si(OR^3)_{4-n}$ ($R^2$ represents alicyclic hydrocarbon group or aromatic hydrocarbon group having 5 to 20 carbon atoms, $R^3$ represents a hydrocarbon group having 1 to 20 carbon atoms, and n represents a number satisfying $0 \leq n \leq 3$) in the state of a solution so that the product of this reaction becomes satisfying the following formula:

$0.98 \leq K \leq 2.2$ wherein $$K = \frac{m}{Z} \cdot \frac{S'}{S + S'}$$

[S represents the area of a peak in $^{13}$C-NMR spectrum of the reaction product assignable to Al-R$^1$ bond, S' represents the area of a peak in $^{13}$C-NMR of the product assignable to the Si-R$^1$ bond formed by the reaction with organoaluminum compound, and Z represents molar ratio of Si atom to Al atom in component (B)].

2. A process according to claim 1, wherein the organoaluminum compound is a compound represented by the general formula Ethyl$_m$AlY$_{3-m}$, wherein m represents a number satisfying $2 \leq m \leq 3$.

3. A process according to claim 2, the organoaluminum compound is triethylaluminum.

4. A process according to claim 1, wherein the organic silicon compound is cyclohexyltrimethoxysilane or phenyltrimethoxysilane.

5. A process according to claim 1, wherein the organoaluminum compound and the organic silicon compound are reacted at a temperature of −50° C. to 200° C. for 30 minutes to about 100 days.

6. A process according to claim 1, the organosilicon compound is used in an amount of 0.01 to 5 moles per one mole of aluminum atom.

7. A process according to claim 1, wherein the amount of an organoaluminum compound to be used in polymerization is selected from the range of 1 to 1,000 moles per one mole of titanium atom in the solid catalyst.

8. A process according to claim 1, wherein the polymerization is carried out at a temperature of 0° to 100° C., under a pressure of about 3 to 100 atmosphere.

9. A process according to claim 1, wherein the alpha olefin is propylene, butene-1, pentene-1, hexene-1, 3-methyl-pentene-1, or 4-methyl-pentene-1.

10. A process according to claim 1, wherein the copolymerization is carried out between alpha-olefin with ethylene.

11. A process according to claim 1, wherein the solid catalyst component (A) is produced by reducing an alkoxytitanium compound with an organomagnesium compound in the presence of an organic silicon compound having Si-O bond to obtain a solid product, and treating the product with an ester compound and a mixture of an ether compound and TiCl$_4$.

12. A process according to claim 1, wherein the solid catalyst component (A) is produced by dissolving magnesium halide and/or alkoxymagnesium compound into alcohol or ether, and thereafter treating the resulting solution with a titanium compound and an ester compound.

* * * * *